US012400586B2

(12) United States Patent
Jeong et al.

(10) Patent No.: US 12,400,586 B2
(45) Date of Patent: Aug. 26, 2025

(54) PIXEL OF A DISPLAY DEVICE AND DISPLAY DEVICE

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/827,138

(22) Filed: Sep. 6, 2024

(65) Prior Publication Data

US 2025/0104610 A1 Mar. 27, 2025

(30) Foreign Application Priority Data

Sep. 22, 2023 (KR) ........................ 10-2023-0127510

(51) Int. Cl.
*G09G 3/32* (2016.01)
*G09G 3/3266* (2016.01)
*G09G 3/3275* (2016.01)

(52) U.S. Cl.
CPC ............. *G09G 3/32* (2013.01); *G09G 3/3266* (2013.01); *G09G 3/3275* (2013.01); *G09G 2310/0216* (2013.01); *G09G 2310/0267* (2013.01); *G09G 2310/0275* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

2011/0267319 A1* 11/2011 Han ..................... G09G 3/3233 345/80
2011/0273428 A1* 11/2011 Han ..................... G09G 3/3283 345/212
2021/0335260 A1* 10/2021 Wang ................... G09G 3/3258
(Continued)

FOREIGN PATENT DOCUMENTS

CN 112509523 A 3/2021
KR 102176454 B1 11/2020
KR 102323292 B1 11/2021

*Primary Examiner* — Nitin Patel
*Assistant Examiner* — Amen E Bogale
(74) *Attorney, Agent, or Firm* — CANTOR COLBURN LLP

(57) ABSTRACT

A pixel includes a capacitor between a line transferring a first power supply voltage and a first node, a first transistor including a gate connected to the first node, a first terminal connected to a second node, and a second terminal connected to a third node, a second transistor including a gate receiving a scan signal, and a terminal connected to the second node, a third transistor including a gate receiving the scan signal, a first terminal connected to the third node, and a second terminal connected to the first node, a fourth transistor including a gate connected to the second node, and a terminal connected to the first node, a fifth transistor including a gate receiving the scan signal, a first terminal connected to the line, a sixth transistor including a terminal connected to the third node, and a light-emitting element connected to the terminal of the sixth transistor.

20 Claims, 14 Drawing Sheets

(56) References Cited

U.S. PATENT DOCUMENTS

| | | | | |
|---|---|---|---|---|
| 2023/0142014 | A1* | 5/2023 | Kim | H10D 89/811 257/79 |
| 2025/0104630 | A1* | 3/2025 | Jeong | G09G 3/3266 |
| 2025/0104654 | A1* | 3/2025 | Jeong | G09G 3/3291 |

* cited by examiner

PIXEL OF A DISPLAY DEVICE AND DISPLAY DEVICE

This application claims to Korean Patent Application No. 10-2023-0127510, filed on Sep. 22, 2023, and all the benefits accruing therefrom under 35 U.S.C. § 119, the content of which in its entirety is herein incorporated by reference.

BACKGROUND

1. Field

Embodiments of the inventive concept relate to a display device, and more particularly to a pixel and a display device including the pixel.

2. Description of the Related Art

Driving transistors of pixels of a display device, such as an organic light-emitting diode ("OLED") display device, may have different threshold voltages due to a process variation, a degradation, etc. Because of this threshold voltage variation, the pixels of the display device may not emit light with uniform luminance. To prevent or reduce the luminance non-uniformity, a pixel performing a compensation operation that compensates for a threshold voltage of a driving transistor has been developed. For example, to perform the compensation operation in a diode connection method, the pixel may diode-connect a driving transistor, and may transfer a data voltage to a gate node of the driving transistor through the diode-connected driving transistor. Thus, in the pixel, the data voltage in which a threshold voltage of the driving transistor is compensated may be applied to the gate node.

In the pixel performing the compensation operation in the diode connection method, the gate node is desired to be initialized to an initialization voltage lower than the data voltage before the data voltage is applied to the gate node. The pixel may receive an initialization signal to provide the initialization voltage to the gate node. Further, the pixel may further receive an emission signal for dividing a frame period into a non-emission period in which the pixel does not emit light and an emission period in which the pixel emits light.

SUMMARY

Some embodiments provide a pixel of a display device that normally operates without an initialization signal and an emission signal.

Some embodiments provide a display device that normally operates without an initialization signal and an emission signal.

In an embodiment of the disclosure, there is provided a pixel of a display device including a capacitor connected between a line which transfers a first power supply voltage and a first node, a first transistor including a gate connected to the first node, a first terminal connected to a second node, and a second terminal connected to a third node, a second transistor including a gate which receives a scan signal, a first terminal connected to a data line, and a second terminal connected to the second node, a third transistor including a gate which receives the scan signal, a first terminal connected to the third node, and a second terminal connected to the first node, a fourth transistor including a gate connected to the second node, a first terminal connected to a line which transfers an initialization voltage, and a second terminal connected to the first node, a fifth transistor including a gate which receives the scan signal, a first terminal connected to the line which transfers the first power supply voltage, and a second terminal connected to the second node, a sixth transistor including a gate which receives the scan signal, a first terminal connected to the third node, and a second terminal, and a light-emitting element including an anode connected to the second terminal of the sixth transistor, and a cathode connected to a line which transfers a second power supply voltage.

In an embodiment, a type of the second and third transistors may be different from a type of the fifth and sixth transistors.

In an embodiment, the second and third transistors may be N-type metal oxide semiconductor ("NMOS") transistors, the fifth and sixth transistors may be P-type metal oxide semiconductor ("PMOS") transistors.

In an embodiment, when the scan signal has a relatively high level, the second and third transistors may be turned on, and the fifth and sixth transistors may be turned off. When the scan signal has a relatively low level, the second and third transistors may be turned off, and the fifth and sixth transistors may be turned on.

In an embodiment, the second and third transistors may be PMOS transistors, and the fifth and sixth transistors may be NMOS transistors.

In an embodiment, when the scan signal has a relatively high level, the second and third transistors may be turned off, and the fifth and sixth transistors may be turned on. When the scan signal has a relatively low level, the second and third transistors may be turned on, and the fifth and sixth transistors may be turned off.

In an embodiment, the fourth transistor may be turned on in response to a reference voltage transferred to the second node through the data line and the second transistor, and the initialization voltage may be higher than the reference voltage.

In an embodiment, the fourth transistor may be turned off in response to a data voltage transferred to the second node through the data line and the second transistor.

In an embodiment, the initialization voltage may be lower than the data voltage.

In an embodiment, a frame period for the pixel may include an initialization period in which the first node and the third node are initialized, a data writing and compensation period in which a data voltage is provided through the data line, and an emission period in which the light-emitting element emits light.

In an embodiment, in the initialization period, the scan signal may have a first level, a reference voltage may be provided through the data line, the second transistor may transfer the reference voltage of the data line to the second node in response to the scan signal having the first level, the fourth transistor may transfer the initialization voltage to the first node in response to the reference voltage of the second node, the third transistor may transfer the initialization voltage of the first node to the third node in response to the scan signal having the first level, and the first node and the third node may be initialized based on the initialization voltage.

In an embodiment, in the data writing and compensation period, the scan signal may have a first level, a data voltage may be provided through the data line, the second transistor may transfer the data voltage of the data line to the second node in response to the scan signal having the first level, the third transistor may diode-connect the first transistor in response to the scan signal having the first level, and a voltage obtained by subtracting a threshold voltage of the first transistor from the data voltage may be applied to the first node through the diode-connected first transistor.

In an embodiment, in the emission period, the scan signal may have a second level different from a first level, the fifth transistor and the sixth transistor may be turned on in response to the scan signal having the second level, the first transistor may generate a driving current based on a voltage of the first node, and the light-emitting element may emit light based on the driving current.

In an embodiment, the pixel may further include a seventh transistor including a gate which receives the scan signal, a first terminal connected to a line which transfers an anode initialization voltage, and a second terminal connected to the anode of the light-emitting element.

In an embodiment of the disclosure, there is provided a pixel of a display device including a capacitor connected between a line which transfers a first power supply voltage and a first node, a first transistor including a gate connected to the first node, a first terminal connected to a second node, and a second terminal connected to a third node, a second transistor including a gate which receives a first scan signal, a first terminal connected to a data line, and a second terminal connected to the second node, a third transistor including a gate which receives a second scan signal, a first terminal connected to the third node, and a second terminal connected to the first node, a fourth transistor including a gate connected to the second node, a first terminal connected to a line which transfers an initialization voltage, and a second terminal connected to the first node, a fifth transistor including a gate which receives the first scan signal, a first terminal connected to the line which transfers the first power supply voltage, and a second terminal connected to the second node, a sixth transistor including a gate which receives the second scan signal, a first terminal connected to the third node, and a second terminal, and a light-emitting element including an anode connected to the second terminal of the sixth transistor, and a cathode connected to a line which transfers a second power supply voltage.

In an embodiment, a type of the second transistor may be different from a type of the fifth transistor, and a type of the third transistor may be different from a type of the sixth transistor.

In an embodiment, a frame period for the pixel may include a source initialization period in which the second node is initialized, an initialization period in which the first node and the third node are initialized, a data writing and compensation period in which a data voltage is provided through the data line, and an emission period in which the light-emitting element emits light.

In an embodiment, in the source initialization period, the first scan signal may have a second level, the second scan signal may have a first level different from the second level, the fifth transistor may transfer the first power supply voltage to the second node in response to the first scan signal having the second level, and the second node may be initialized based on the first power supply voltage.

By embodiments, there is provided a display device including a display panel including a plurality of pixels, a data driver connected to each of the plurality of pixels through a data line, and a scan driver which provides a scan signal to each of the plurality of pixels. Each of the plurality of pixels includes a capacitor connected between a line which transfers a first power supply voltage and a first node, a first transistor including a gate connected to the first node, a first terminal connected to a second node, and a second terminal connected to a third node, a second transistor including a gate which receives the scan signal, a first terminal connected to a data line, and a second terminal connected to the second node, a third transistor including a gate which receives the scan signal, a first terminal connected to the third node, and a second terminal connected to the first node, a fourth transistor including a gate connected to the second node, a first terminal connected to a line which transfers an initialization voltage, and a second terminal connected to the first node, a fifth transistor including a gate which receives the scan signal, a first terminal connected to the line which transfers the first power supply voltage, and a second terminal connected to the second node, a sixth transistor including a gate which receives the scan signal, a first terminal connected to the third node, and a second terminal, and a light-emitting element including an anode connected to the second terminal of the sixth transistor, and a cathode connected to a line which transfers a second power supply voltage.

In an embodiment, a type of the second and third transistors may be different from a type of the fifth and sixth transistors.

As described above, in a pixel of a display device in embodiments, a gate of a fourth transistor may be connected to a second node. Further, the fourth transistor may be turned on in response to a reference voltage applied to the second node through a data line and a second transistor, and may be turned off in response to a data voltage applied to the second node through the data line and the second transistor. Accordingly, the pixel in embodiments may be implemented without a separate signal (e.g., an initialization signal) for turning on or off the fourth transistor. Further, in the pixel of the display device in embodiments, a type of second and third transistors may be different from a type of fifth and sixth transistors, and the second, third, fifth and sixth transistors may receive the same scan signal. Accordingly, the pixel in embodiments may be implemented without a separate signal (e.g., an emission signal) for turning on or off the fifth and sixth transistors. Accordingly, the number of signal lines of the display device may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
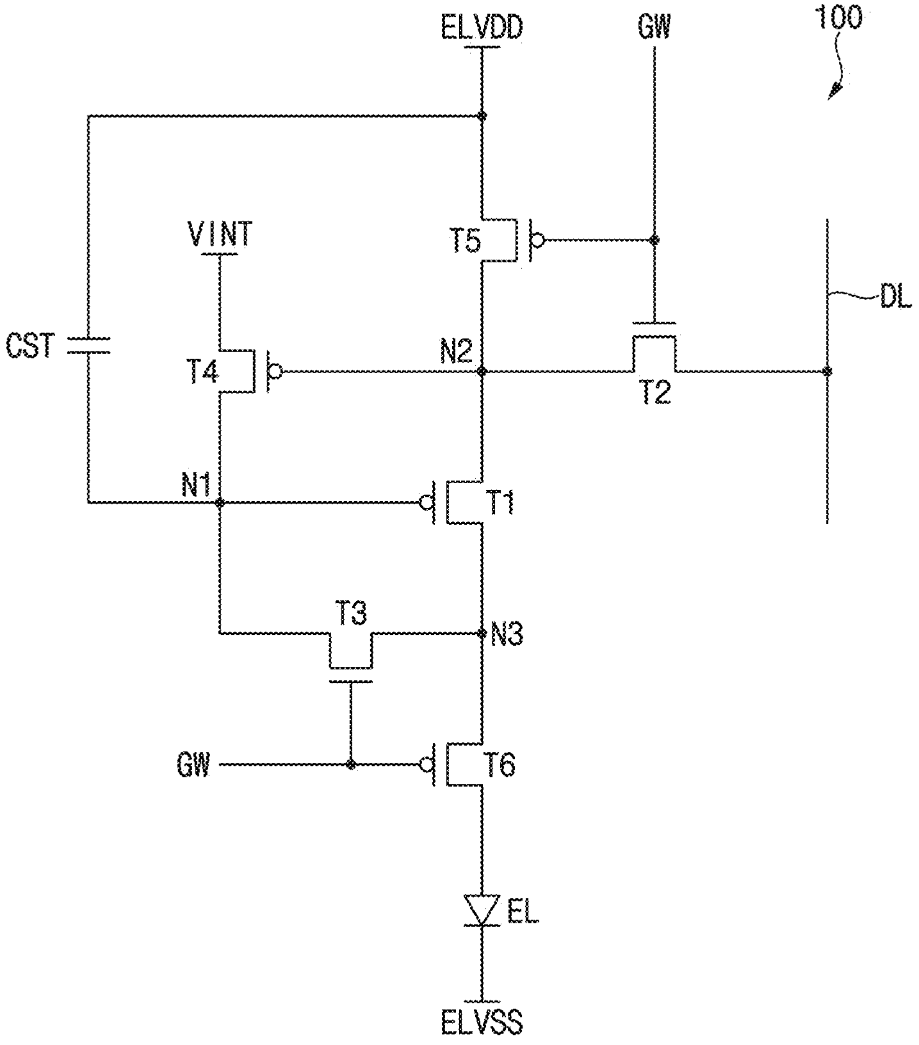
FIG. 1 is a circuit diagram illustrating an embodiment of a pixel.

Hereinafter, embodiments of the inventive concept will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a circuit diagram illustrating an embodiment of a pixel.

Referring to FIG. 1, a pixel 100 in embodiments may include a capacitor CST, a first transistor T1, a second transistor T2, a third transistor T3, a fourth transistor T4, a fifth transistor T5, a sixth transistor T6 and a light-emitting element EL.

The capacitor CST may be connected between a line for transferring a first power supply voltage ELVDD (e.g., a relatively high power supply voltage) and a first node N1. The first node N1 may be a gate node connected to a gate of the first transistor T1. In some embodiments, the capacitor CST may be also referred to as a storage capacitor for storing a data voltage. Further, in some embodiments, the capacitor CST may include a first electrode connected to the line for transferring the first power supply voltage ELVDD, and a second electrode connected to the first node N1.

The first transistor T1 may generate a driving current based on a voltage of the first node N1. In some embodiments, the first transistor T1 may be also referred to as a driving transistor for driving the light-emitting element EL. Further, in some embodiments, the first transistor T1 may include a gate connected to the first node N1, a first terminal (e.g., a source) connected to a second node N2, and a second terminal (e.g., a drain) connected to a third node N3.

The second transistor T2 may connect a data line DL to the second node N2 in response to a scan signal GW. The second node N2 may be a source node connected to the source of the first transistor T1. In some embodiments, the second transistor T2 may be also referred to as a scan transistor or a switching transistor for transferring a voltage of the data line DL to the second node N2. Further, in some embodiments, the second transistor T2 may include a gate for receiving the scan signal GW, a first terminal connected to the data line DL, and a second terminal connected to the second node N2.

The third transistor T3 may connect the first node N1 and the third node N3 to each other in response to the scan signal GW. The third node N3 may be a drain node connected to the drain of the first transistor T1. By the third transistor T3, the gate node and the drain node are connected to each other, and thus the first transistor T1 may be diode-connected. In some embodiments, the third transistor T3 may be also referred to as a compensation transistor for diode-connecting the first transistor T1. Further, in some embodiments, the third transistor T3 may include a gate for receiving the scan signal GW, a first terminal connected to the third node N3, and a second terminal connected to the first node N1.

The fourth transistor T4 may transfer an initialization voltage VINT to the first node N1 in response to a voltage of the second node N2. In some embodiments, the fourth transistor T4 may be also referred to as an initialization transistor for providing the initialization voltage VINT to the first node N1, or the gate node. Further, in some embodiments, the fourth transistor T4 may include a gate connected to the second node N2, a first terminal connected to a line for transferring the initialization voltage VINT, and a second terminal connected to the first node N1.

The fifth transistor T5 may connect the line for transferring the first power supply voltage ELVDD and the second node N2 to each other in response to the scan signal GW. In some embodiments, the fifth transistor T5 may be also referred to as a first emission transistor for forming a path of the driving current provided to the light-emitting element EL. Further, in some embodiments, the fifth transistor T5 may include a gate for receiving the scan signal GW, a first terminal connected to the line for transferring the first power supply voltage ELVDD, and a second terminal connected to the second node N2.

The sixth transistor T6 may connect the third node N3 and an anode of the light-emitting element EL to each other in response to the scan signal GW. In some embodiments, the sixth transistor T6 may be also referred to as a second emission transistor for forming the path of the driving current provided to the light-emitting element EL. Further, in some embodiments, the sixth transistor T6 may include a gate for receiving the scan signal GW, a first terminal connected to the third node N3, and a second terminal connected to the anode of the light-emitting element EL.

The light-emitting element EL may emit light in response to the driving current generated by the first transistor T1. In some embodiments, the light-emitting element EL may be an organic light-emitting diode ("OLED"), but is not limited thereto. In an embodiment, the light-emitting element EL may be a nano light-emitting diode ("NED"), a quantum dot ("QD") light-emitting diode, a micro-light-emitting diode, an inorganic light-emitting diode, or any other suitable light-emitting element, for example. Further, in some embodiments, the light-emitting element EL may include the anode connected to the second terminal of the sixth transistor T6, and a cathode connected to a line for transferring a second power supply voltage ELVSS (e.g., a relatively low power supply voltage).

In the pixel 100 of the display device in embodiments, a type of the second and third transistors T2 and T3 may be different from a type of the fifth and sixth transistors T5 and T6. In some embodiments, as illustrated in FIG. 1, the second and third transistors T2 and T3 may be N-type transistors, e.g., N-type metal oxide semiconductor ("NMOS") transistors, and the fifth and sixth transistors T5 and T6 may be P-type transistors, e.g., P-type metal oxide semiconductor ("PMOS") transistors. Further, the second, third, fifth and sixth transistors T2, T3, T5 and T6 may receive the same scan signal GW. In this case, when the scan signal GW has a relatively high level, the second and third transistors T2 and T3 may be turned on, and the fifth and sixth transistors T5 and T6 may be turned off. Further, when the scan signal GW has a relatively low level, the second and third transistors T2 and T3 may be turned off, and the fifth and sixth transistors T5 and T6 may be turned on.

Further, in the pixel 100 of the display device in embodiments, the gate of the fourth transistor T4 may be connected to the second node N2. Thus, the fourth transistor T4 may not receive a separate signal (e.g., an initialization signal), and may be turned on or off in response to the voltage of the second node N2. In some embodiments, the fourth transistor T4 may be turned on in response to a reference voltage applied to the second node N2 through the data line DL and the second transistor T2, and may be turned off in response to the data voltage applied to the second node N2 through the data line DL and the second transistor T2. Accordingly, the pixel 100 in embodiments may be implemented without the separate signal (e.g., the initialization signal) for turning on or off the fourth transistor T4, and the number of signal lines of the display device including the pixel 100 may be reduced.

In addition, as described above, the type of the second and third transistors T2 and T3 may be different from the type of the fifth and sixth transistors T5 and T6, and the second, third, fifth and sixth transistors T2, T3, T5 and T6 may receive the same scan signal GW. Accordingly, the pixel 100 in embodiments may be implemented without a separate signal (e.g., an emission signal) for turning on or off the fifth and sixth transistors T5 and T6, and the number of signal lines of the display device including the pixel 100 may be further reduced.

Hereinafter, an operation of the pixel 100 in embodiments will be described with reference to FIGS. 1 through 5.

Figure 2:
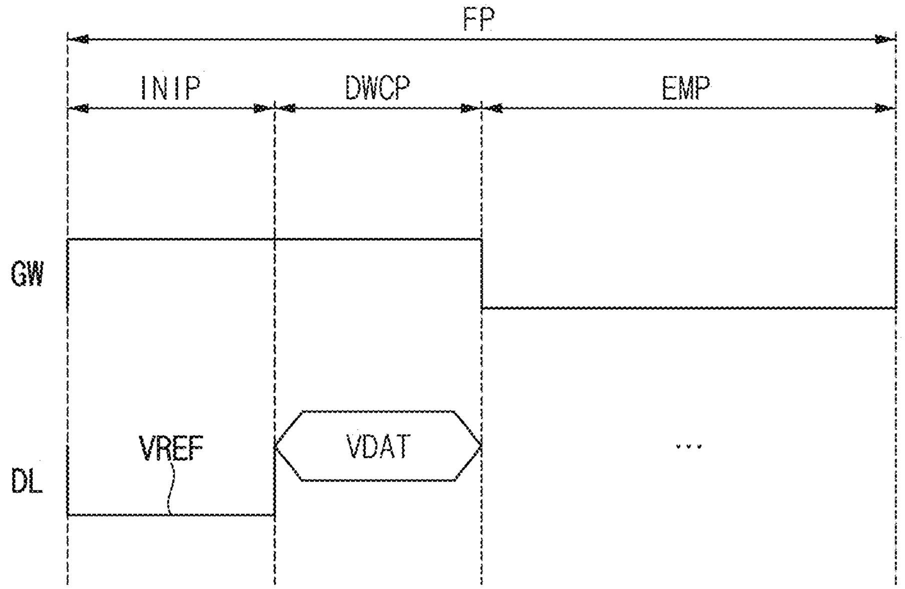
FIG. 2 is a timing diagram for describing an embodiment of an operation of a pixel.
Figure 3:
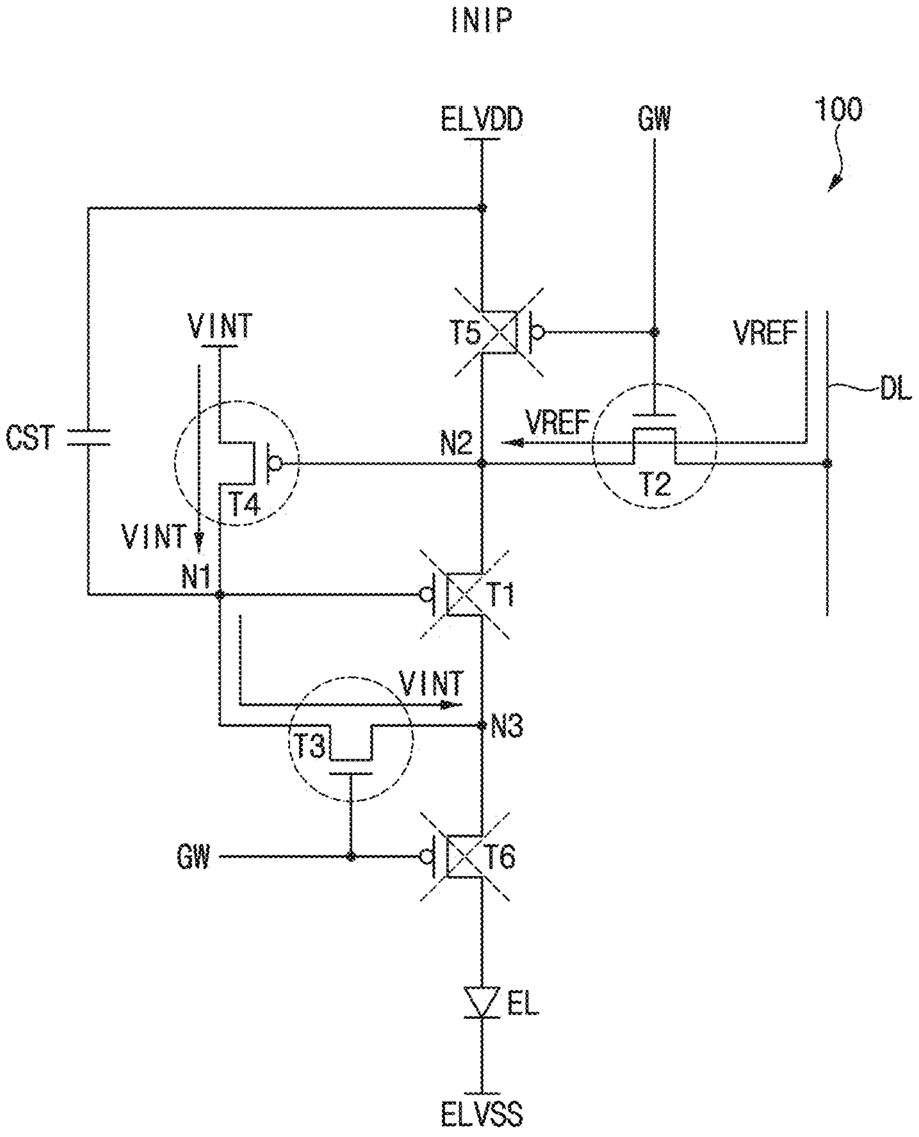
FIG. 3 is a circuit diagram for describing an operation of a pixel in an initialization period.
Figure 4:
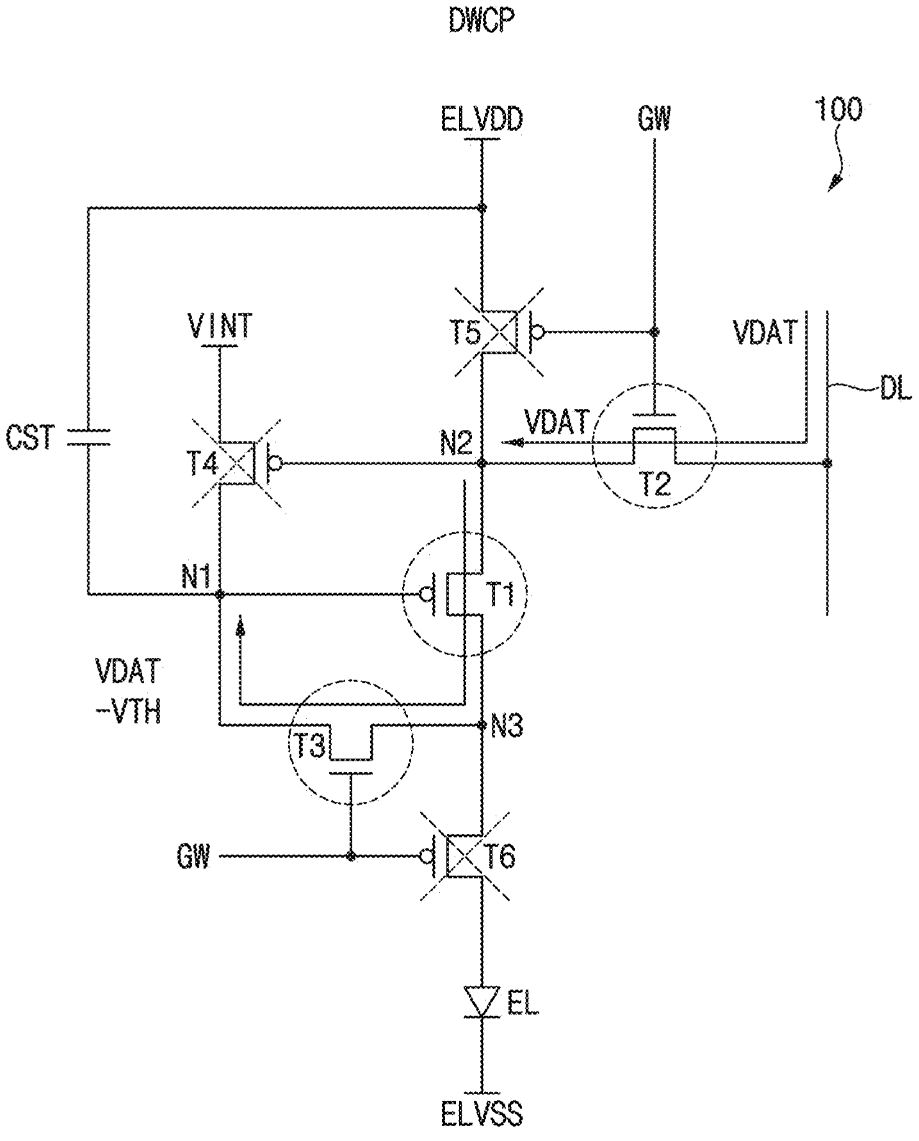
FIG. 4 is a circuit diagram for describing an operation of a pixel in a data writing and compensation period.
Figure 5:
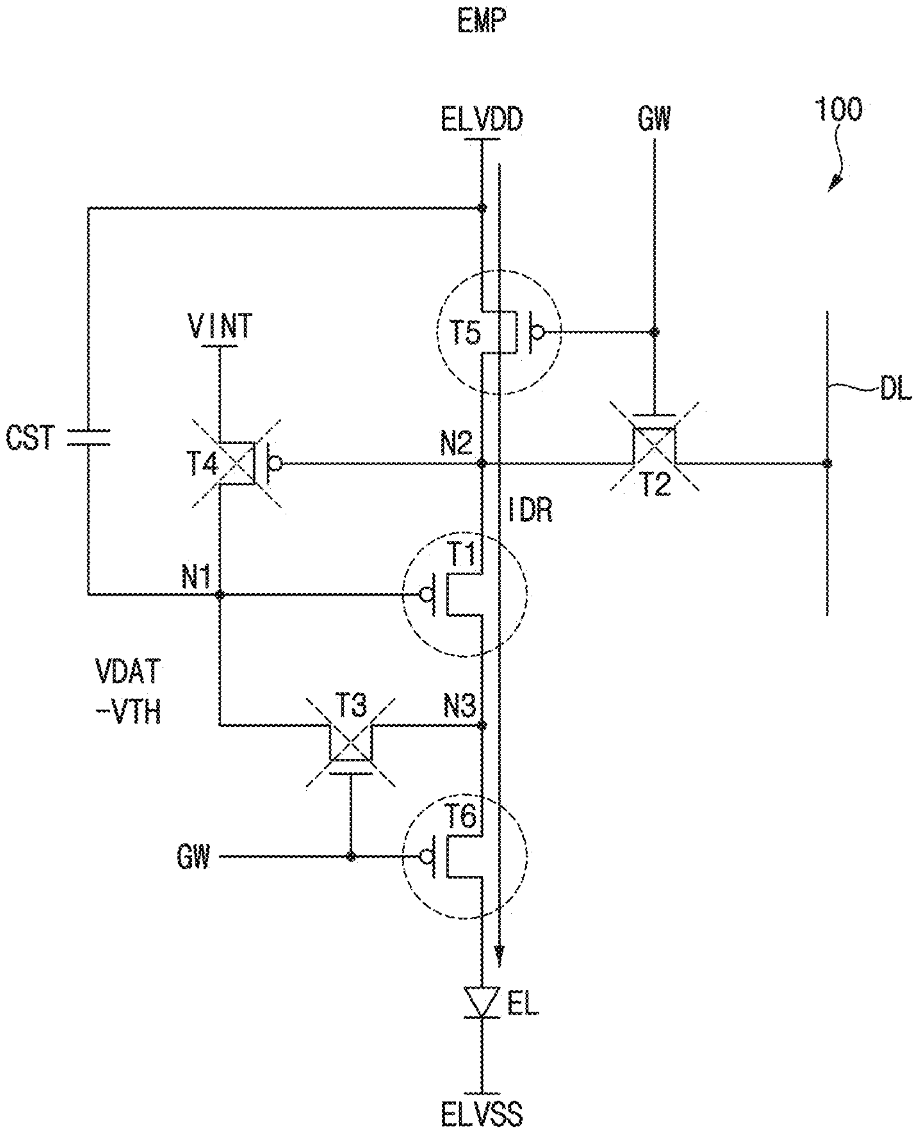
FIG. 5 is a circuit diagram for describing an operation of a pixel in an emission period.

FIG. 2 is a timing diagram for describing an embodiment of an operation of a pixel in embodiments, FIG. 3 is a circuit diagram for describing an operation of a pixel in an initialization period, FIG. 4 is a circuit diagram for describing an operation of a pixel in a data writing and compensation period, and FIG. 5 is a circuit diagram for describing an operation of a pixel in an emission period.

Referring to FIGS. 1 and 2, a frame period FP for the pixel 100 may include an initialization period INIP in which the first node N1 and the third node N3 are initialized, a data writing and compensation period DWCP in which the data voltage VDAT is provided through the data line DL, and an emission period EMP in which the light-emitting element EL emits light.

In the initialization period INIP, the scan signal GW may have a first level, and the reference voltage VREF may be provided through the data line DL. In some embodiments, as illustrated in FIG. 2, the first level may be a relatively high level. As illustrated in FIG. 3, the fifth and sixth transistors T5 and T6 may be turned off in response to the scan signal GW having the first level. The second transistor T2 may be turned on in response to the scan signal GW having the first level, and may transfer the reference voltage VREF of the data line DL to the second node N2. The fourth transistor T4 may be turned on in response to the reference voltage VREF transferred to the second node N2 through the data line DL and the second transistor T2. In some embodiments, to turn on the fourth transistor T4, the reference voltage VREF applied to the gate of the fourth transistor T4 may be lower than the initialization voltage VINT applied to one terminal (e.g., a source) of the fourth transistor T4. That is, the initialization voltage VINT and the reference voltage VREF may be set such that the initialization voltage VINT is higher than the reference voltage VREF. In an embodiment, the initialization voltage VINT may be about 3 volts (V), and the reference voltage VREF may be about 0V, for example. However, the initialization voltage VINT and the reference voltage VREF are not limited thereto.

Further, the fourth transistor T4 that is turned on in response to the reference voltage VREF at the second node N2 may transfer the initialization voltage VINT to the first node N1. Since the initialization voltage VINT applied to the first node N1 is higher than the reference voltage VREF applied to the second node N2, the first transistor T1 may be turned off. In addition, the third transistor T3 may be turned on in response to the scan signal GW having the first level, and may transfer the initialization voltage VINT at the first node N1 to the third node N3. Accordingly, the first node N1 and the third node N3 may be initialized based on the initialization voltage VINT. Since the first node N1 (e.g., a gate node) is initialized to the initialization voltage VINT, a compensation operation in a diode connection method may be normally performed in the data writing and compensation period DWCP. Further, since the third node N3 (e.g., a drain node) is initialized to the initialization voltage VINT, residual charges remaining at the drain node may be discharged or removed.

In the data writing and compensation period DWCP, the scan signal GW may have the first level, and the data voltage VDAT may be provided through the data line DL. As illustrated in FIG. 4, the fifth and sixth transistors T5 and T6 may be turned off in response to the scan signal GW having the first level. The second transistor T2 may be turned on in response to the scan signal GW having the first level, and may transfer the data voltage VDAT of the data line DL to the second node N2. The fourth transistor T4 may be turned off in response to the data voltage VDAT transferred to the second node N2 through the data line DL and the second transistor T2. In some embodiments, to turn off the fourth transistor T4, the data voltage VDAT applied to the gate of the fourth transistor T4 may be higher than the initialization voltage VINT applied to the one terminal (e.g., the source) of the fourth transistor T4. That is, the initialization voltage VINT and a range of the data voltage VDAT may be set such that the initialization voltage VINT is lower than the range of the data voltage VDAT, or that the initialization voltage VINT is lower than a minimum data voltage (e.g., the data voltage VDAT corresponding to a highest gray level). In an embodiment, the initialization voltage VINT may be about 3V, and the data voltage VDAT may range from about 5V to about 7V, for example. However, the initialization voltage VINT and the data voltage VDAT are not limited thereto.

Further, the third transistor T3 may be turned on in response to the scan signal GW having the first level, and may diode-connect the first transistor T1. Since the data voltage VDAT of the second node N2 is applied to the first node N1 through the diode-connected first transistor T1, a voltage VDAT-VTH obtained by subtracting a threshold voltage VTH of the first transistor T1 from the data voltage VDAT may be applied to the first node N1. This operation may be also referred to as a compensation operation in a diode connection method. Further, the storage capacitor CST may store, at the first node N1, the voltage VDAT-VTH obtained by subtracting the threshold voltage VTH of the first transistor T1 from the data voltage VDAT.

In the emission period EMP, the scan signal GW may have a second level. In some embodiments, as illustrated in FIG. 2, the second level may be a relatively low level. As illustrated in FIG. 5, the second and third transistors T2 and T3 may be turned off in response to the scan signal GW having the second level. Further, a turn-off state of the fourth transistor T4 may be maintained based on the first power supply voltage ELVDD transferred to the second node N2 through the fifth transistor T5. The first transistor T1 may generate the driving current IDR based on the voltage of the first node N1, or the voltage VDAT-VTH obtained by subtracting the threshold voltage VTH from the data voltage VDAT. The fifth transistor T5 may be turned on in response to the scan signal GW having the second level, and may connect the line for transferring the first power supply voltage ELVDD to the second node N2. The sixth transistor T6 may be turned on in response to the scan signal GW having the second level, and may connect the third node N3 to the anode of the light-emitting element EL. Thus, the fifth and sixth transistors T5 and T6 may form a path for the driving current IDR from the line for transferring the first power supply voltage ELVDD to the line for transferring the second power supply voltage ELVSS. The light-emitting element EL may emit light based on the driving current IDR generated by the first transistor T1.

As described above, in the pixel 100 of the display device in embodiments, since the fourth transistor T4 is be turned on and off based on the reference voltage VREF and the data voltage VDAT provided through the data line DL, the display device including the pixel 100 may be implemented without a separate signal (e.g., an initialization signal). Further, in the pixel 100 of the display device in embodiments, the second, third, fifth and sixth transistors T2, T3, T5 and T6 may be turned on and off based on the same scan signal GW. Accordingly, the pixel 100 may be driven using only one scan signal GW, and the number of signal lines of the display device including the pixel 100 may be reduced.

Figure 6:
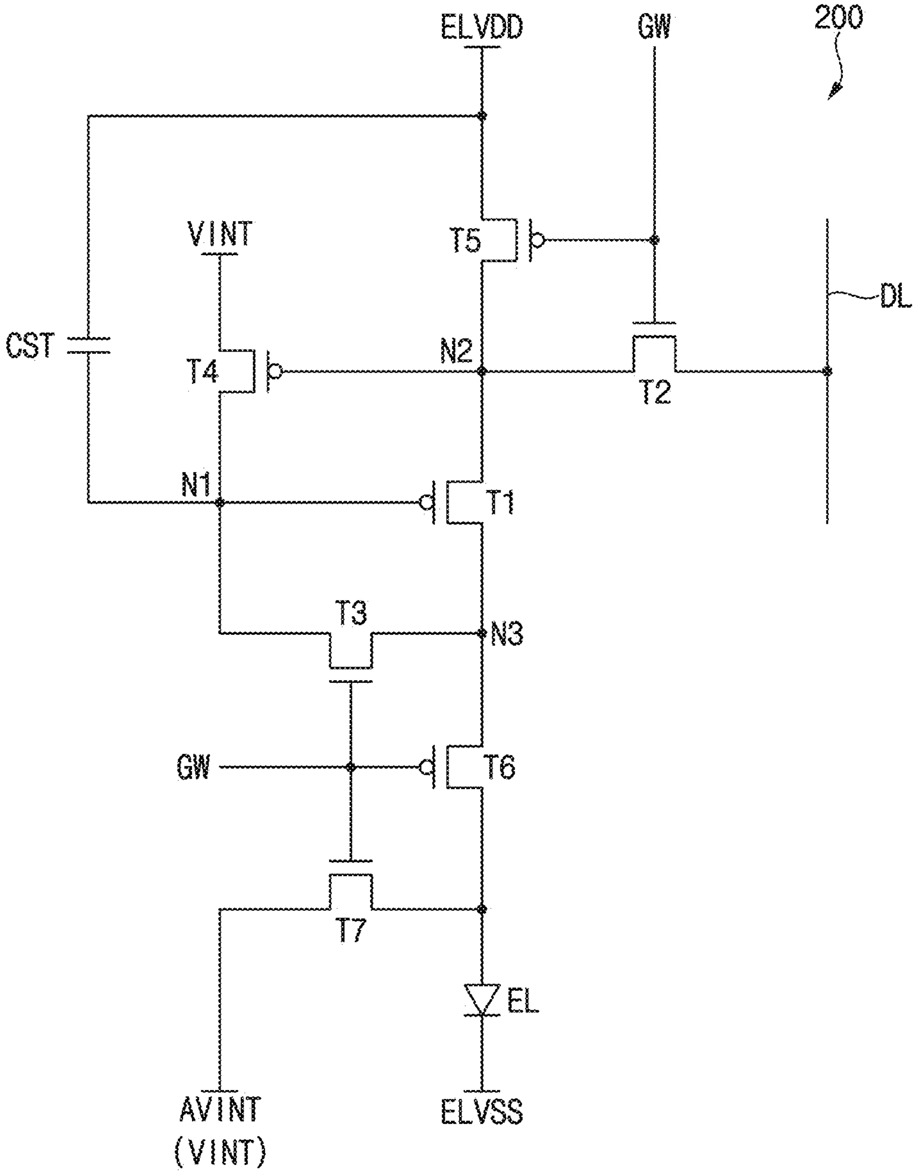
FIG. 6 is a circuit diagram illustrating an embodiment of a pixel.

FIG. 6 is a circuit diagram illustrating an embodiment of a pixel.

Referring to FIG. 6, a pixel 200 in embodiments may include a capacitor CST, a first transistor T1, a second transistor T2, a third transistor T3, a fourth transistor T4, a fifth transistor T5, a sixth transistor T6, a seventh transistor T7 and a light-emitting element EL. The pixel 200 of FIG. 6 may have substantially the same configuration as that of a pixel 100 of FIG. 1, except that the pixel 200 may further include the seventh transistor T7.

The seventh transistor T7 may transfer an anode initialization voltage AVINT to an anode of the light-emitting element EL in response to a scan signal GW. In some embodiments, in an initialization period INIP and a data writing and compensation period DWCP illustrated in FIG. 2, the seventh transistor T7 may provide the anode initialization voltage AVINT to the anode of the light-emitting element EL, and the anode of the light-emitting element EL may be initialized based on the anode initialization voltage AVINT. In some embodiments, the seventh transistor T7 may include a gate for receiving the scan signal GW, a first terminal connected to a line for transferring the anode initialization voltage AVINT, and a second terminal connected to the anode of the light-emitting element EL.

A type of the seventh transistor T7 may be substantially the same as a type of the second and third transistors T2 and T3 such that the seventh transistor T7 is turned on while the second and third transistors T2 and T3 are turned on. In some embodiments, the seventh transistor T7 may be an N-type transistor, e.g., an NMOS transistor. In other embodiments, as described below with reference to FIG. 9, the seventh transistor T7 may be a P-type transistor, e.g., a PMOS transistor.

Further, in some embodiments, the anode initialization voltage AVINT may be substantially the same as an initialization voltage VINT, and the line for transferring the anode initialization voltage AVINT and a line for transferring the initialization voltage VINT may be the same line. In other embodiments, the anode initialization voltage AVINT may be different from the initialization voltage VINT, and the line for transferring the anode initialization voltage AVINT may be different from the line for transferring the initialization voltage VINT.

Figure 7:
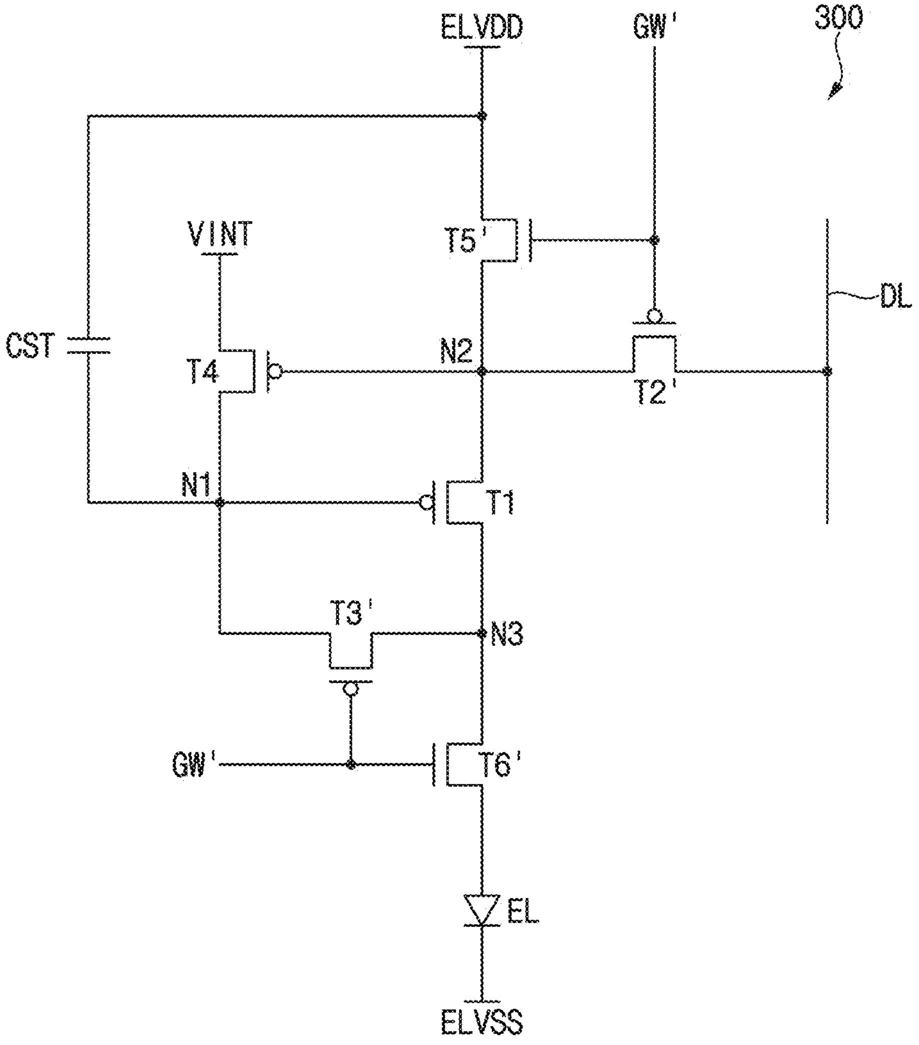
FIG. 7 is a circuit diagram illustrating an embodiment of a pixel.
Figure 8:
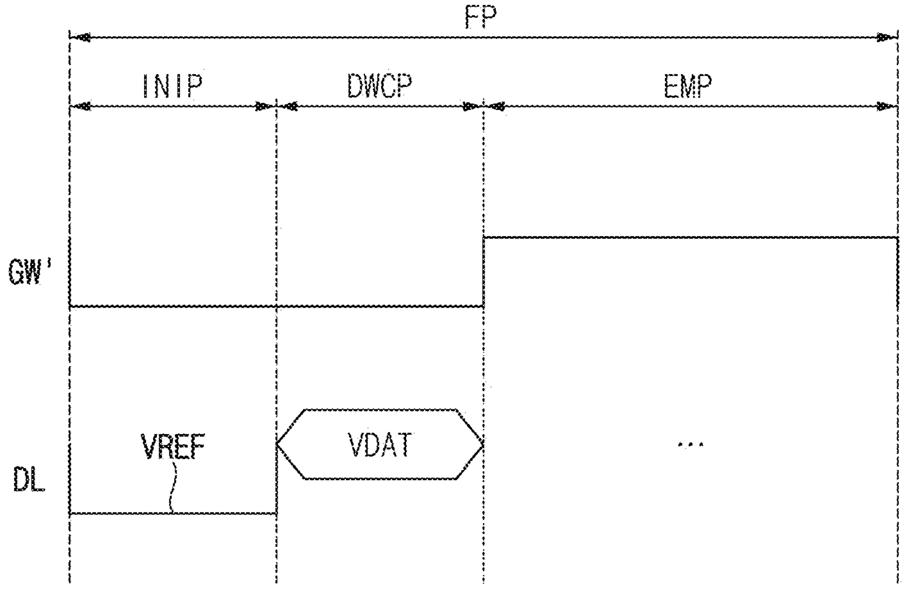
FIG. 8 is a timing diagram for describing an embodiment of an operation of a pixel.

FIG. 7 is a circuit diagram illustrating an embodiment of a pixel in embodiments, and FIG. 8 is a timing diagram for describing an embodiment of an operation of a pixel.

Referring to FIG. 7, a pixel 300 in embodiments may include a capacitor CST, a first transistor T1, a second transistor T2', a third transistor T3', a fourth transistor T4, a fifth transistor T5', a sixth transistor T6' and a light-emitting element EL. The pixel 300 of FIG. 7 may have substantially the same configuration as that of a pixel 100 of FIG. 1, except that the second and third transistors T2' and T3' may be PMOS transistors and the fifth and sixth transistors T5' and T6' may be NMOS transistors.

In the pixel 300 of FIG. 7, the second, third, fifth and sixth transistors T2', T3', T5' and T6' may receive the same scan signal GW'. When the scan signal GW' has a relatively high level, the second and third transistors T2' and T3' may be turned off, and the fifth and sixth transistors T5' and T6' may be turned on. Further, when the scan signal GW' has a relatively low level, the second and third transistors T2' and T3' may be turned on, and the fifth and sixth transistors T5' and T6' may be turned on. In addition, as illustrated in FIG. 8, the scan signal GW' may have the relatively low level in an initialization period INIP and a data writing and compensation period DWCP, and may have the relatively high level in an emission period EMP. Thus, in the initialization period INIP and the data writing and compensation period DWCP, the second and third transistors T2' and T3' may be turned on, and the fifth and sixth transistors T5' and T6 may be turned off. Further, in the emission period EMP, the second and third transistors T2' and T3' may be turned off, and the fifth and sixth transistors T5' and T6' may be turned on.

Figure 9:
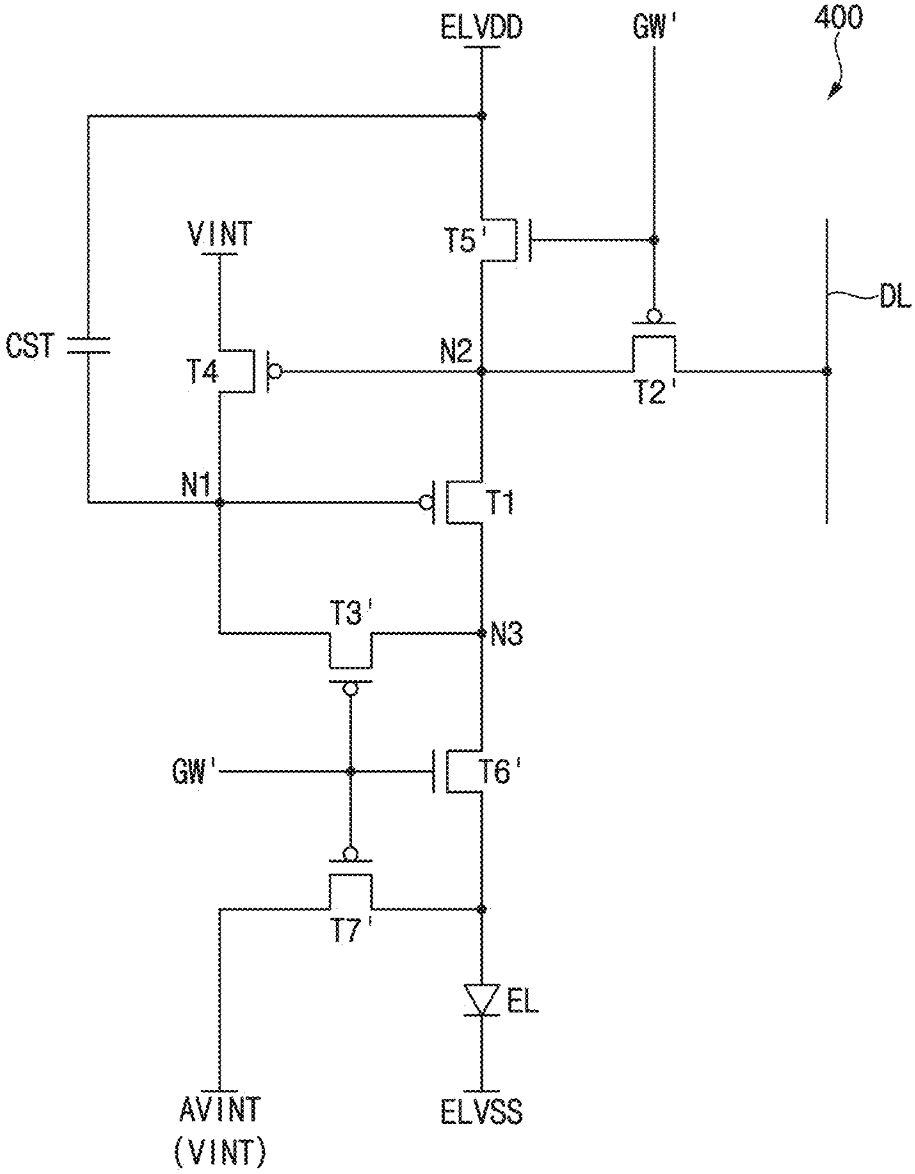
FIG. 9 is a circuit diagram illustrating an embodiment of a pixel.

FIG. 9 is a circuit diagram illustrating an embodiment of a pixel.

Referring to FIG. 9, the pixel 400 in embodiments may include a capacitor CST, a first transistor T1, a second transistor T2', a third transistor T3', a fourth transistor T4, a fifth transistor T5', a sixth transistor T6', a seventh transistor T7' and a light-emitting element EL. The pixel 400 of FIG. 9 may have substantially the same configuration as that of a pixel 300 of FIG. 7, except that the pixel 400 may further include the seventh transistor T7'.

A type of the seventh transistor T7' may be substantially the same as a type of the second and third transistors T2' and T3' such that the seventh transistor T7' is turned on while the second and third transistors T2' and T3' are turned on. In some embodiments, as illustrated in FIG. 9, the seventh transistor T7' may be a P-type transistor, e.g., a PMOS transistor.

Figure 10:
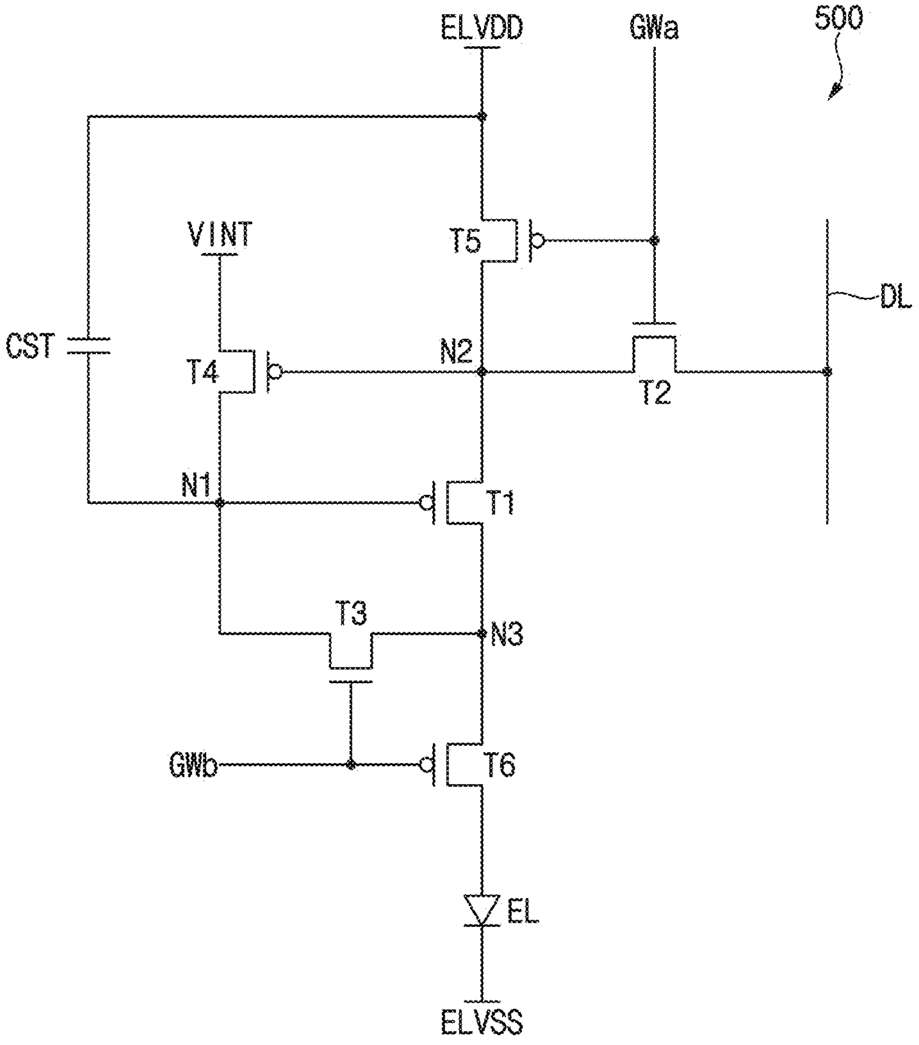
FIG. 10 is a circuit diagram illustrating an embodiment of a pixel.
Figure 11:
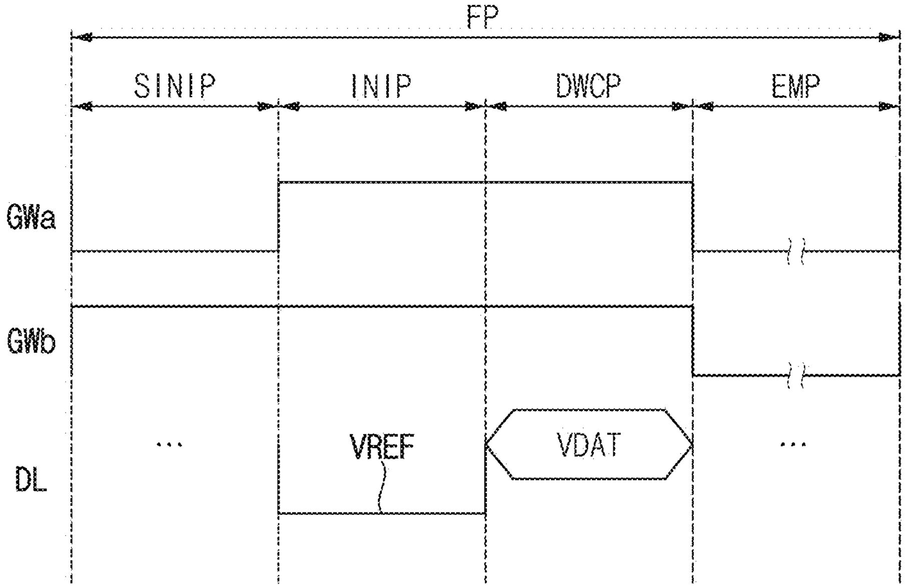
FIG. 11 is a timing diagram for describing an embodiment of an operation of a pixel.

FIG. 10 is a circuit diagram illustrating an embodiment of a pixel, and FIG. 11 is a timing diagram for describing an embodiment of an operation of a pixel.

Referring to FIG. 10, a pixel 500 in embodiments may include a capacitor CST, a first transistor T1, a second transistor T2, a third transistor T3, a fourth transistor T4, a fifth transistor T5, a sixth transistor T6 and a light-emitting element EL. The pixel 500 of FIG. 10 may have substantially the same configuration as that of a pixel 100 of FIG. 1, except that gates of the second and fifth transistors T2 and T5 may receive a first scan signal GWa, and gates of the third and sixth transistors T3 and T6 may receive a second scan signal GWb.

Further, referring to FIGS. 10 and 11, a frame period FP for the pixel 500 may include a source initialization period SINIP in which a second node N2 is initialized, an initialization period INIP, a data writing and compensation period DWCP and an emission period EMP. A timing diagram of FIG. 11 may be substantially the same as a timing diagram of FIG. 2, except that the frame period FP may further include the source initialization period SINIP.

In the source initialization period SINIP, the first scan signal GWa may have a second level (e.g., a relatively low level), and the second scan signal GWb may have a first level (e.g., a relatively high level). The sixth transistor T6 may be turned off in response to the second scan signal GWb having the first level. Thus, a path for a driving current from a line for transferring a first power supply voltage ELVDD to a line for transferring a second power supply voltage ELVSS may not be formed, and the light-emitting element EL may not emit light. Further, in response to the first scan signal GWa having the second level, the second transistor T2 may be turned off, and the fifth transistor T5 may be turned on. The turned-on fifth transistor T5 may transfer the first power supply voltage ELVDD to the second node N2. Accordingly, the second node N2 may be initialized based on the first power supply voltage ELVDD. Since the second node N2 (e.g., a source node) is initialized to the first power supply voltage ELVDD, residual charges remaining at the source node may be discharged or removed.

In the initialization period INIP and the data writing and compensation period DWCP, both of the first scan signal GWa and the second scan signal GWb may have the first level. In the emission period EMP, both of the first scan signal GWa and the second scan signal GWb may have the second level. Thus, in the initialization period INIP, the data writing and compensation period DWCP and the emission period EMP, an operation of the pixel 500 may be substantially the same as an operation of the pixel 100 of FIG. 1.

Although FIG. 10 illustrates an embodiment in which the second and third transistors T2 and T3 are NMOS transistors and the fifth and sixth transistors T5 and T6 are PMOS transistors, in other embodiments, the second and third transistors T2 and T3 may be implemented as PMOS transistors, and the fifth and sixth transistors T5 and T6 may be implemented as NMOS transistors. Further, in other embodiments, the pixel 500 may further include a seventh transistor for transferring an anode initialization voltage to an anode of the light-emitting element EL in response to the first scan signal GWa or the second scan signal GWb.

Figure 12:
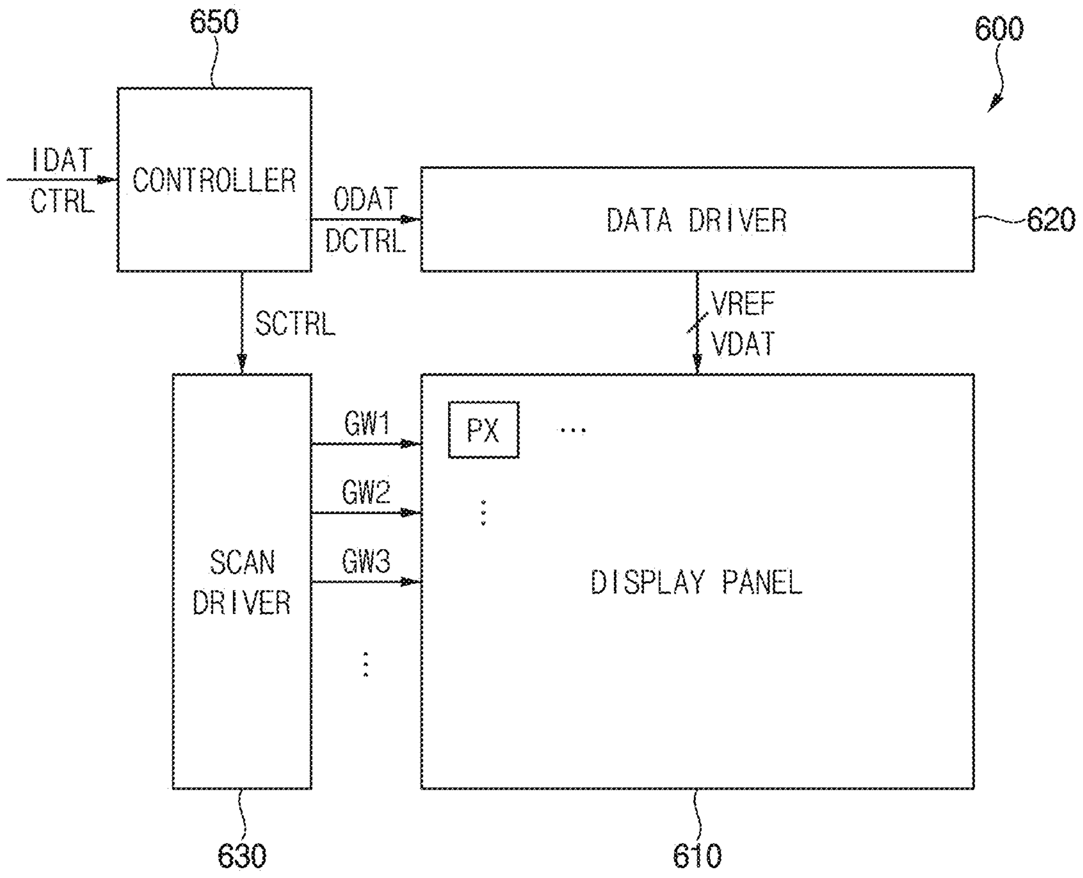
FIG. 12 is a block diagram illustrating an embodiment of a display device.
Figure 13:
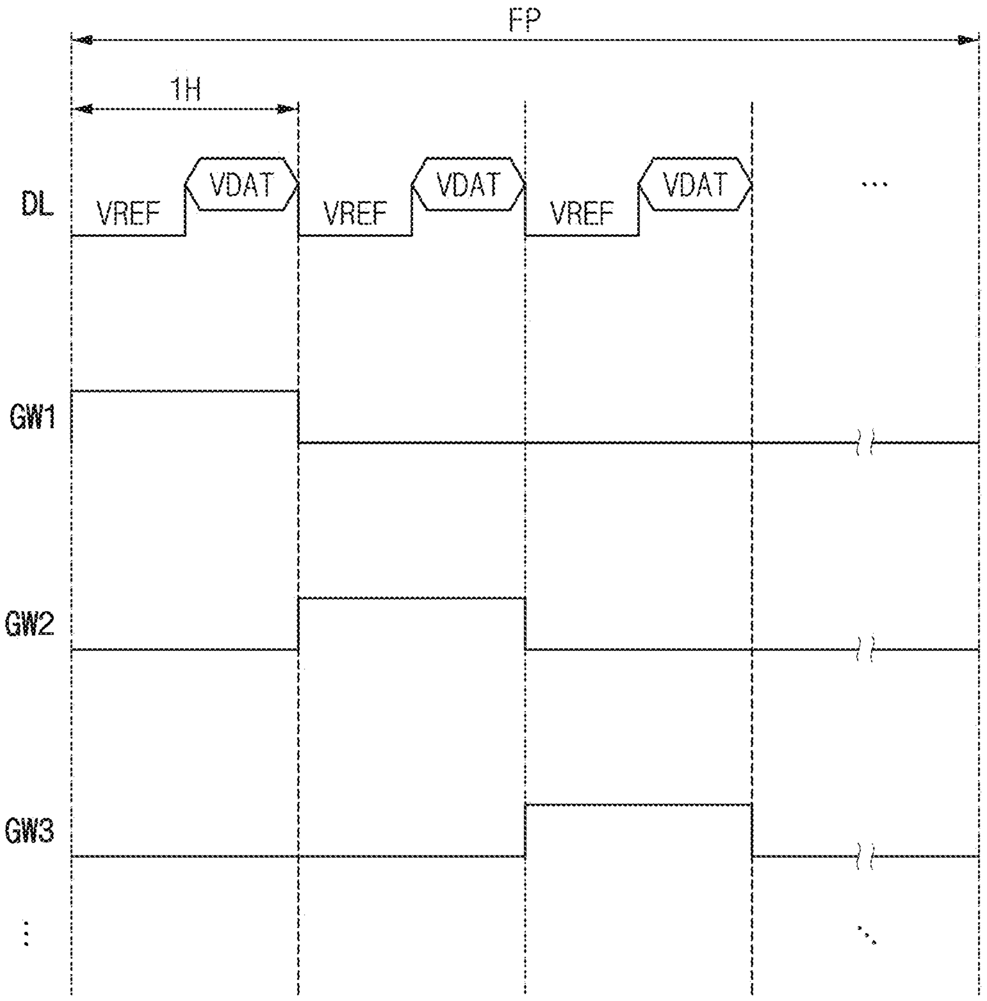
FIG. 13 is a timing diagram for describing an embodiment of an operation of a display device.

FIG. 12 is a block diagram illustrating an embodiment of a display device, and FIG. 13 is a timing diagram for describing an embodiment of an operation of a display device.

Referring to FIG. 12, a display device 600 in embodiments may include a display panel 610 that includes a plurality of pixels PX, a data driver 620 that is connected to each of the plurality of pixels PX through a data line, a scan driver 630 that provides scan signals GW1, GW2, GW3, . . . , and a controller 650 that controls the data driver 620 and the scan driver 630.

The display panel 610 may include the plurality of pixels PX. By embodiments, each pixel PX of the display panel 610 may be a pixel 100 of FIG. 1, a pixel 200 of FIG. 6, a pixel 300 of FIG. 7, a pixel 400 of FIG. 9, a pixel 500 of FIG. 10, or the like. In each pixel PX, a fourth transistor may be turned on based on a reference voltage VREF provided through the data line from the data driver 620, and may be turned off based on a data voltage VDAT provided from the data driver 620 through the data line. Accordingly, the display device 600 may be implemented without a separate signal (e.g., an initialization signal) for turning on or off the fourth transistor. Further, in each pixel PX, second, third, fifth and sixth transistors may be turned on and off based on the same scan signal GW1, GW2, GW3, . . . . Accordingly, the display device 600 may be implemented without a separate signal (e.g., an emission signal) for turning on or off the fifth and sixth transistors. Therefore, each pixel PX may be driven using only one scan signal GW1, GW2, GW3, . . . , and the number of signal lines of the display device 600 may be reduced.

The data driver 620 may generate the reference voltage VREF and the data voltages VDAT based on output image data ODAT and a data control signal DCTRL received from the controller 650, and may provide the reference voltage VREF and the data voltages VDAT to the plurality of pixels PX. In some embodiments, the data control signal DCTRL may include, but is not limited to, an output data enable signal, a horizontal start signal, and a load signal. In some embodiments, the data driver 620 may alternately provide the reference voltage VREF and the data voltage (VDAT) to each data line. Further, in each horizontal time, the data driver 620 may sequentially output the reference voltage VREF and the data voltage VDAT to each data line. In an embodiment, as illustrated in FIG. 13, in a first horizontal time 1H allocated to a first pixel row, the data driver 620 may first output the reference voltage VREF to each data line, and then may output the data voltage VDAT for the pixel PX disposed in the first pixel row to the data line, for example. Further, in a second horizontal time allocated to a second pixel row, the data driver 620 may sequentially output the reference voltage VREF and the data voltage VDAT for the pixel PX disposed in the second pixel row to each data line. In addition, in a third horizontal time allocated to a third pixel row, the data driver 620 may sequentially output the reference voltage VREF and the data voltage VDAT for the pixel PX disposed in the third pixel row to each data line. Further, in some embodiments, the data driver 620 and the controller 650 may be implemented as a single integrated circuit ("IC"), and the single IC may be also referred to as a timing controller embedded data driver ("TED"). In other embodiments, the data driver 620 and the controller 650 may be implemented as separate ICs.

The scan driver 630 may provide the scan signals GW1, GW2, GW3, . . . to the plurality of pixels PX based on a scan control signal SCTRL received from the controller 650. The scan control signal SCTRL may include, but is not limited to, a scan start signal and a scan clock signal. Further, as illustrated in FIG. 13, the scan driver 630 may sequentially provide the scan signals GW1, GW2, GW3, . . . to the plurality of pixels PX on a row-by-row basis. In an embodiment, the scan driver 630 may provide a first scan signal GW1 having a first level (e.g., a relatively high level) to the first pixel row, and then may provide a second scan signal GW2 having the first level to the second pixel row, for example. Thereafter, the scan driver 630 may provide a third scan signal GW3 having the first level to the third pixel row. In some embodiments, the scan driver 630 may be integrated or formed in a peripheral region of the display panel 610. In other embodiments, the scan driver 630 may be integrated or formed in a display region of the display panel 610. In still other embodiments, the scan driver 630 may be implemented as one or more ICs.

The controller 650 (e.g., a timing controller) may receive input image data IDAT and a control signal CTRL from an external host processor (e.g., a graphics processing unit ("GPU"), an application processor ("AP"), or a graphics card). In some embodiments, the control signal CTRL may include, but is not limited to, a vertical synchronization signal, a horizontal synchronization signal, an input data enable signal, and a master clock signal. The controller 650 may generate the output image data ODAT, the data control signal DCTRL and the scan control signal SCTRL based on the input image data IDAT and the control signal CTRL. The controller 650 may control the data driver 620 by providing the output image data ODAT and the data control signal DCTRL to the data driver 620, and may control the scan driver 630 by providing the scan control signal SCTRL to the scan driver 630.

Figure 14:
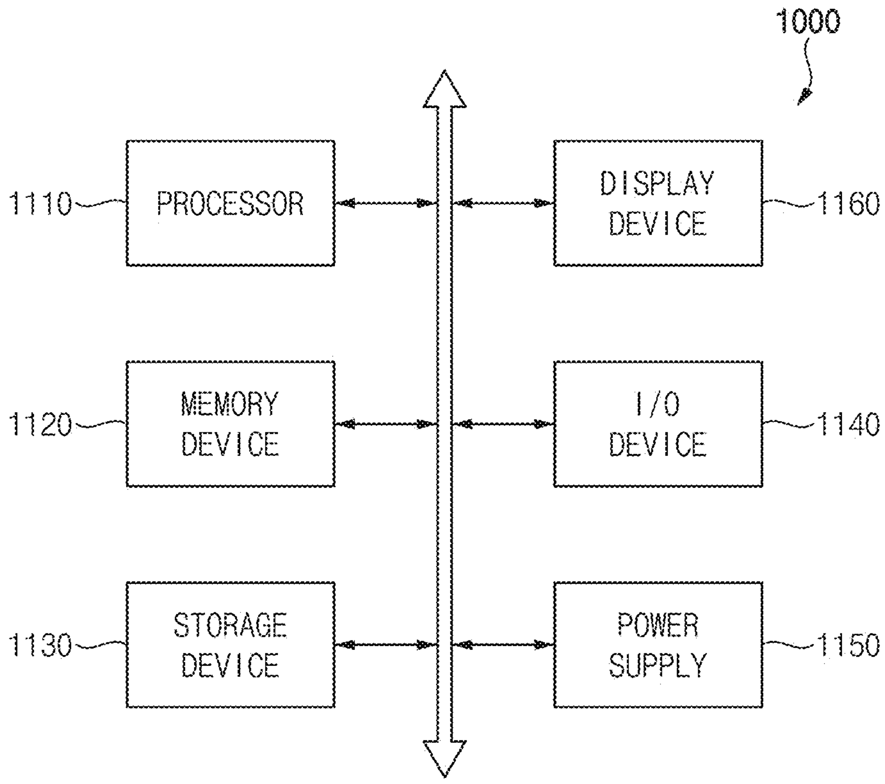
FIG. 14 is a block diagram illustrating an embodiment of an electronic device including a display device.

FIG. 14 is a block diagram illustrating an embodiment of an electronic device including a display device.

Referring to FIG. 14, an electronic device 1000 may include a processor 1110, a memory device 1120, a storage device 1130, an input/output ("I/O") device 1140, a power supply 1150 and a display device 1160. The electronic device 1000 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a microprocessor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1000. In an embodiment, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc., for example.

The storage device 1130 may be a solid state drive ("SSD") device, a hard disk drive ("HDD") device, a compact disc read-only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1000. The display device 1160 may be coupled to other components through the buses or other communication links.

In the display device 1160, a fourth transistor of each pixel may be turned on and off in response to a reference voltage and a data voltage provided through a data line instead of a separate signal (e.g., an initialization signal). Further, second, third, fifth and sixth transistors of each pixel may be turned on and off based on the same scan signal. Accordingly, each pixel may be driven using only one signal, or the scan signal, and thus the number of signal lines of the display device 1160 may be reduced.

The inventive concepts may be applied to any display device 1160 and any electronic device 1000 including the display device 1160. In an embodiment, the inventive concepts may be applied to a smart phone, a wearable electronic device, a tablet computer, a mobile phone, a television ("TV") (e.g., a digital TV, a three dimensional ("3D") TV, etc.), a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A pixel of a display device, the pixel comprising:

a capacitor connected between a line which transfers a first power supply voltage and a first node;

a first transistor including a gate connected to the first node, a first terminal connected to a second node, and a second terminal connected to a third node;

a second transistor including a gate which receives a scan signal, a first terminal connected to a data line, and a second terminal connected to the second node;

a third transistor including a gate which receives the scan signal, a first terminal connected to the third node, and a second terminal connected to the first node;

a fourth transistor including a gate connected to the second node, a first terminal connected to a line which transfers an initialization voltage, and a second terminal connected to the first node;

a fifth transistor including a gate which receives the scan signal, a first terminal connected to the line which transfers the first power supply voltage, and a second terminal connected to the second node;

a sixth transistor including a gate which receives the scan signal, a first terminal connected to the third node, and a second terminal; and a light-emitting element including an anode connected to the second terminal of the sixth transistor, and a cathode connected to a line which transfers a second power supply voltage.

2. The pixel of claim 1, wherein a type of the second and third transistors is different from a type of the fifth and sixth transistors.

3. The pixel of claim 1, wherein the second and third transistors are N-type metal oxide semiconductor transistors, and wherein the fifth and sixth transistors are P-type metal oxide semiconductor transistors.

4. The pixel of claim 3, wherein, when the scan signal has a relatively high level, the second and third transistors are turned on, and the fifth and sixth transistors are turned off, and wherein, when the scan signal has a relatively low level, the second and third transistors are turned off, and the fifth and sixth transistors are turned on.

5. The pixel of claim 1, wherein the second and third transistors are P-type metal oxide semiconductor transistors, and wherein the fifth and sixth transistors are N-type metal oxide semiconductor transistors.

6. The pixel of claim 5, wherein, when the scan signal has a relatively high level, the second and third transistors are turned off, and the fifth and sixth transistors are turned on, and wherein, when the scan signal has a relatively low level, the second and third transistors are turned on, and the fifth and sixth transistors are turned off.

7. The pixel of claim 1, wherein the fourth transistor is turned on in response to a reference voltage transferred to the second node through the data line and the second transistor, and wherein the initialization voltage is higher than the reference voltage.

8. The pixel of claim 1, wherein the fourth transistor is turned off in response to a data voltage transferred to the second node through the data line and the second transistor.

9. The pixel of claim 8, wherein the initialization voltage is lower than the data voltage.

10. The pixel of claim 1, wherein a frame period for the pixel includes:

an initialization period in which the first node and the third node are initialized;

a data writing and compensation period in which a data voltage is provided through the data line; and an emission period in which the light-emitting element emits light.

11. The pixel of claim 10, wherein, in the initialization period, the scan signal has a first level, a reference voltage is provided through the data line, the second transistor transfers the reference voltage of the data line to the second node in response to the scan signal having the first level, the fourth transistor transfers the initialization voltage to the first node in response to the reference voltage of the second node, the third transistor transfers the initialization voltage of the first node to the third node in response to the scan signal having the first level, and the first node and the third node are initialized based on the initialization voltage.

12. The pixel of claim 10, wherein, in the data writing and compensation period, the scan signal has a first level, a data voltage is provided through the data line, the second transistor transfers the data voltage of the data line to the second node in response to the scan signal having the first level, the third transistor diode-connects the first transistor in response to the scan signal having the first level, and a voltage obtained by subtracting a threshold voltage of the first transistor from the data voltage is applied to the first node through the diode-connected first transistor.

13. The pixel of claim 10, wherein, in the emission period, the scan signal has a second level different from a first level, the fifth transistor and the sixth transistor are turned on in response to the scan signal having the second level, the first transistor generates a driving current based on a voltage of the first node, and the light-emitting element emits light based on the driving current.

14. The pixel of claim 1, further comprising:

a seventh transistor including a gate which receives the scan signal, a first terminal connected to a line which transfers an anode initialization voltage, and a second terminal connected to the anode of the light-emitting element.

15. A pixel of a display device, the pixel comprising:

a capacitor connected between a line which transfers a first power supply voltage and a first node;

a first transistor including a gate connected to the first node, a first terminal connected to a second node, and a second terminal connected to a third node;

a second transistor including a gate which receives a first scan signal, a first terminal connected to a data line, and a second terminal connected to the second node;

a third transistor including a gate which receives a second scan signal, a first terminal connected to the third node, and a second terminal connected to the first node;

a fourth transistor including a gate connected to the second node, a first terminal connected to a line which transfers an initialization voltage, and a second terminal connected to the first node;

a fifth transistor including a gate which receives the first scan signal, a first terminal connected to the line which transfers the first power supply voltage, and a second terminal connected to the second node;

a sixth transistor including a gate which receives the second scan signal, a first terminal connected to the third node, and a second terminal; and a light-emitting element including an anode connected to the second terminal of the sixth transistor, and a cathode connected to a line which transfers a second power supply voltage.

16. The pixel of claim 15, wherein a type of the second transistor is different from a type of the fifth transistor, and wherein a type of the third transistor is different from a type of the sixth transistor.

17. The pixel of claim 15, wherein a frame period for the pixel includes:

a source initialization period in which the second node is initialized;

an initialization period in which the first node and the third node are initialized;

a data writing and compensation period in which a data voltage is provided through the data line; and an emission period in which the light-emitting element emits light.

18. The pixel of claim 17, wherein, in the source initialization period, the first scan signal has a second level, the second scan signal has a first level different from the second level, the fifth transistor transfers the first power supply voltage to the second node in response to the first scan signal having the second level, and the second node is initialized based on the first power supply voltage.

19. A display device comprising:

a display panel including a plurality of pixels, each of the plurality of pixels including:

a capacitor connected between a line which transfers a first power supply voltage and a first node;

a first transistor including a gate connected to the first node, a first terminal connected to a second node, and a second terminal connected to a third node;

a second transistor including a gate which receives a scan signal, a first terminal connected to a data line, and a second terminal connected to the second node;

a third transistor including a gate which receives the scan signal, a first terminal connected to the third node, and a second terminal connected to the first node;

a fourth transistor including a gate connected to the second node, a first terminal connected to a line which transfers an initialization voltage, and a second terminal connected to the first node;

a fifth transistor including a gate which receives the scan signal, a first terminal connected to the line which transfers the first power supply voltage, and a second terminal connected to the second node;

a sixth transistor including a gate which receives the scan signal, a first terminal connected to the third node, and a second terminal; and a light-emitting element including an anode connected to the second terminal of the sixth transistor, and a cathode connected to a line which transfers a second power supply voltage;

a data driver connected to each of the plurality of pixels through the data line; and a scan driver which provides the scan signal to each of the plurality of pixels.

20. The display device of claim 19, wherein a type of the second and third transistors is different from a type of the fifth and sixth transistors.

* * * * *